United States Patent [19]
Broer et al.

[11] Patent Number: 5,688,566
[45] Date of Patent: Nov. 18, 1997

[54] LIQUID CRYSTAL DISPLAY DEVICE

[75] Inventors: Dirk J. Broer; Johannes A. M. M. Van Haaren, both of Eindhoven, Netherlands

[73] Assignee: U.S. Philips Corporation, New York, N.Y.

[21] Appl. No.: 602,541

[22] Filed: Feb. 20, 1996

[30] Foreign Application Priority Data

Feb. 23, 1995 [EP] European Pat. Off. ............... 95200443

[51] Int. Cl.$^6$ .................................................. G02F 1/1335
[52] U.S. Cl. ...................... 428/1; 349/117; 349/121
[58] Field of Search ..................... 428/1; 359/73; 349/117, 121

[56] References Cited

U.S. PATENT DOCUMENTS 5,212,819  5/1993  Wada ........................................ 359/73

FOREIGN PATENT DOCUMENTS

0423881A1  4/1991  European Pat. Off. ...... G02F 1/1335

*Primary Examiner*—Alexander Thomas
*Attorney, Agent, or Firm*—Michael E. Marion

[57] ABSTRACT

A liquid crystal display cell having a compensation layer of (polymer) material deposited from the gaseous phase. To obtain a smaller angle dependence, the birefringence of the compensation layer is rendered complementary to that associated with a given voltage across the liquid crystal cell by giving the optical axis of the compensation layer an angle to the direction transverse to the cell.

13 Claims, 2 Drawing Sheets

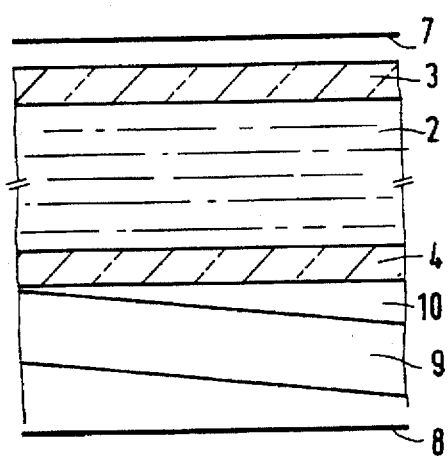
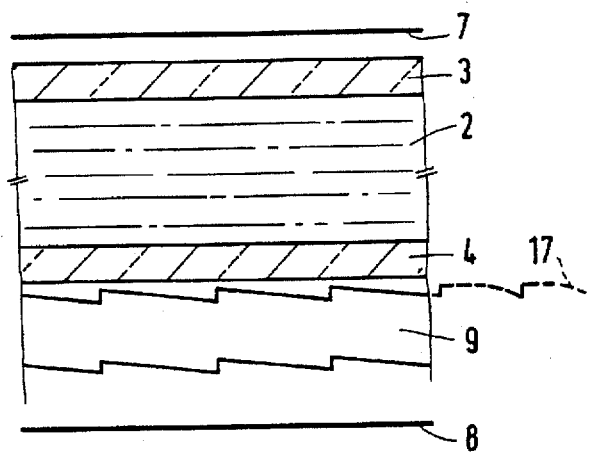
FIG.4a  FIG.4b
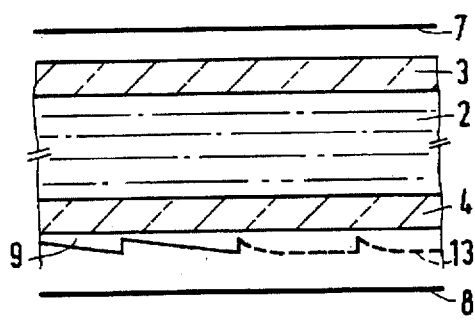
FIG.4c
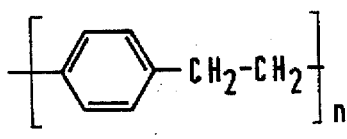
FIG.5a
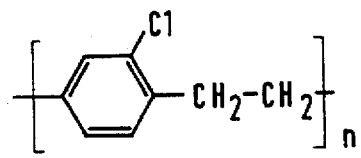
FIG.5b
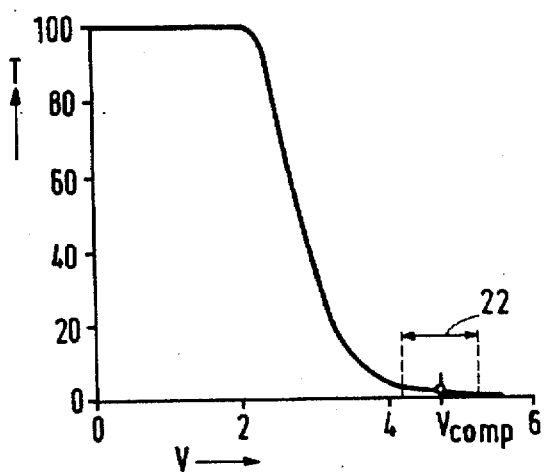
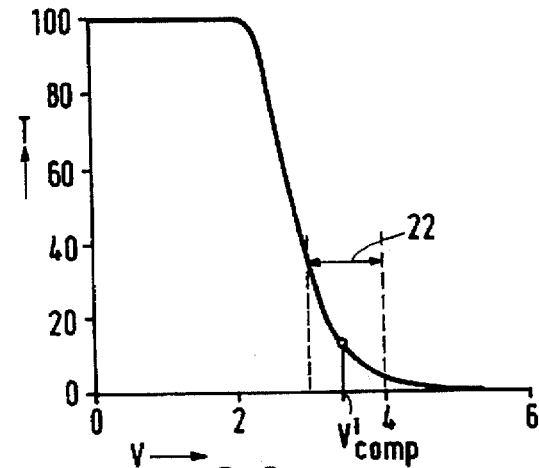
FIG.6a  FIG.6b

LIQUID CRYSTAL DISPLAY DEVICE

BACKGROUND OF THE INVENTION

The invention relates to a liquid crystal display device comprising a liquid crystal display cell having a layer of nematic liquid crystal material which is present between two substrates provided with electrodes, and at least a polarizer and at least an optically anisotropic layer. The invention also relates to a retardation foil or retardation layer for use in, for example liquid crystal display devices.

Such display devices are generally used in, for example monitors, TV applications and, for example display devices in motorcars and aircraft, and for instruments. The foils (and retardation layers) may also be used in angle-invariant optical delay devices.

A display device of the type described in the opening paragraph is known from EP-A-0 423 881 (PHN 13,108). In this Application, a compensation foil comprising an optically anisotropic layer of a polymer material with a cholesteric ordering is used to inhibit discoloration in a twisted-nematic display device and obtain a high contrast. The polymer material is ordered in such a way that a molecular helix can be distinguished, with the axis of the helix being directed transversely to the layer.

However, display devices in which such compensation foils are used still have a large angle dependence, i.e. the contrast is very much dependent on the angle at which and the direction from which the display device is being watched, unless the pitch of the helix of the polymer material is chosen to be very small. Manufacture of such polymers having a cholesteric helix with a small pitch requires very cumbersome process steps, because one stereo isomer must be isolated every time so as to obtain the desired molecular rotation, while, moreover, the materials suitable for this purpose are very expensive.

SUMMARY OF THE INVENTION

It is, inter alia an object of the invention to provide display devices of the type described in the opening paragraph, in which the angle dependence is reduced considerably, while the optically anisotropic layer (retardation foil) can be manufactured in a simple manner and with inexpensive materials. It is a further object of the invention to provide a (retardation) foil which can be used in such display devices.

To this end, a first display device according to the invention is characterized in that fie optically anisotropic layer is provided by means of gaseous phase deposition.

It has surprisingly been found that deposition from the gaseous phase, which is optically isotropic in itself, leads to (usually polymeric) birefringent layers which also form a "conformable coating" on the surface. Particularly, poly-p-xylylene (PPX) or a derivative thereof is suitable for this operation.

A first embodiment is characterized in that the optical axis of the optically anisotropic layer extends at an angle to a direction transverse to the substrates.

A further liquid crystal display device according to the invention, comprising a liquid crystal display cell having a layer of nematic liquid crystal material which is present between two substrates provided with electrodes, and at least a polarizer and at least an optically anisotropic layer, in which the optical axis of the optically anisotropic layer extends at an angle to a direction transverse to the substrates is characterized in that the optically anisotropic layer comprises poly-p-xylylene or a derivative thereof.

As stated hereinbefore, the (poly-p-xylylene (PPX)) can be provided in a simple manner in the gaseous phase by means of pyrolysis of a cyclic dimer. The polymer film thus obtained constitutes a "conformable coating", which means that the birefringent layers are in compliance with the surface structures on which precipitation takes place. This has the advantage that, no planarization is induced due to surface tensions like it happens at precipitation from a solution. A chlorinated poly-p-xylylene (PPX)-C is preferably used.

The invention is based on the recognition that in practice and at the maximum voltage across the liquid crystal material, the directors in this material still extend at a small angle to the direction perpendicular to the substrates. Consequently, the birefringence is different for different viewing angles and is not symmetrical with respect to a direction perpendicular to the two substrates, which accounts for the angle dependence of a liquid crystal having a nematic structure. It is true that this angle dependence may be reduced by means of a compensation foil; however, when a compensation foil is used in the device as described above, in which the optical axis of the anisotropic layer is directed transversely to the substrates, the compensation is optimal for an isotropic liquid crystal layer, i.e. a situation in which the directors are directed perpendicularly to the substrates. In practice, this situation occurs only at very high voltages (still disregarding the fact that the molecules are anchored on the substrates in such a way that this is impossible close to the substrates).

By choosing, in accordance with the second embodiment, the optical axis of the optically anisotropic layer to be substantially parallel to the direction of the directors of the liquid crystal molecules, taken at an avenge across the layer of nematic liquid crystal material at a given voltage, the angle dependence of the total device is changed in such a way that light beams which have undergone a large birefringence in the liquid crystal (at a given drive voltage, the "given voltage") are more compensated by the birefringence in the compensation layer than light beams which have undergone a small birefringence in the liquid crystal. As it were, the optical axis in the compensation layer is now substantially parallel to the avenge direction of the directors in the layer of liquid crystal material. Dependent on the voltage chosen, the angle of the optical axis of the optically anisotropic layer with respect to the direction transverse to the pixel can be adapted in given implementations of the invention. The "given voltage" is preferably chosen to be such that the described compensation of the birefringence occurs in a near-zero transmission range; for example, the voltage in the voltage/transmission characteristic at which 10% of the maximum transmission occurs is used for this purpose.

The optically anisotropic layer preferably has a surface structure, for example a sawtooth structure on at least one of its boundary surfaces. In a device using a plurality of pixels, the pitch of the sawtooth structure is preferably of the order of the pixel size, or smaller.

This type of layer may be provided as a part of a display device, but also as a coating on a (micro)lens structure or optical device.

If a sawtooth structure is provided on both boundary surfaces, the sawtooth directions, i.e. the directions in which the separate teeth increase in thickness can be rotated with respect to each other, for example through an angle having the size of the twist angle of the liquid crystal layer, and preferably through 90°. Such a structure has a smaller retardation (difference in optical path length for the ordinary and extraordinary light beam, also expressed as d.Δn with d: thickness of the material, Δn: optical anisotropy) for perpendicularly incident light, while the angle dependence due to an angle-dependent refractive index is compensated.

The optically anisotropic layer may also comprise sublayers, for example, the layer may comprise a uniaxial foil as a sub-layer.

A (retardation) foil according to the invention having an optically anisotropic layer is characterized in that the optically anisotropic layer comprises parylene (poly-p-xylylene (PPX)).

These and other aspects of the invention will be apparent from and elucidated with reference to the embodiments described hereinafter.

DETAILED DESCRIPTION OF THE PREFERRED EMBODIMENTS

Figure 1:
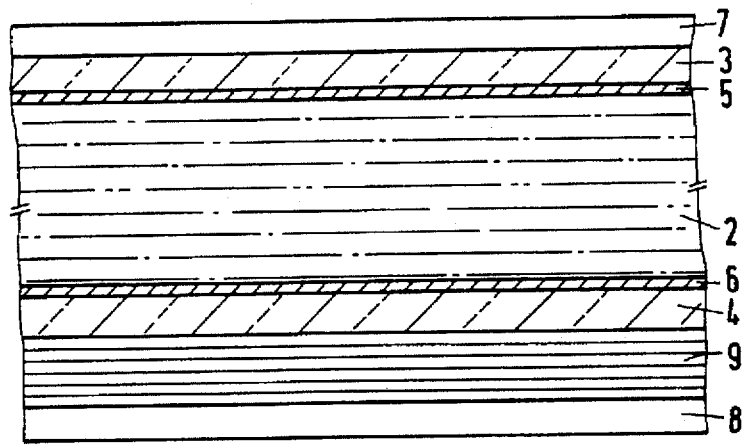
FIG. 1 is a diagrammatic cross-section of a part of a liquid crystal display device according to the invention.

FIG. 1 is a diagrammatic cross-section of a part of a liquid crystal display device comprising a liquid crystal cell 1 with a twisted-nematic liquid crystal material 2 being present between two substrates 3, 4 of, for example glass, provided with electrodes 5, 6. The device further comprises two polarizers 7, 8 whose direction of polarization is mutually crossed perpendicularly. The device further comprises orientation layers (not shown) which orient the liquid crystal material on the inner walls of the substrates, in this example in the direction of the axes of polarization of the polarizers, such that the cell has a twist angle of 90 degrees. In this case, the liquid crystal material has a positive optical anisotropy and a positive dielectric anisotropy. If necessary, the device comprises color filters, while the electrodes 5, 6 can be energized via or not via active switching elements such as diodes or transistors. If the electrodes 5, 6 are energized with an electric voltage, the molecules, and hence the directors, orient themselves to the field. In the ideal case, all molecules are thus substantially perpendicular to the two substrates (situation 11 in FIG. 2). However, in practice this situation requires a too high voltage; at customary voltages, the molecules extend at a small angle to the normal on the substrates 3, 4, corresponding to situation 12 in FIG. 2. From the direction 13, the viewing direction is rather in the direction of the molecules so that said angle dependence still occurs for light which is still transmitted at this voltage. This angle dependence may be explained by means of the "optical indicatrix", a three-dimensional geometric representation of the refractive index for each direction in which the vector of the electric field component of the light can oscillate. For optically isotropic material it is, for example convex, for biaxial material it is an ellipsoid and for uniaxial material it is an ellipsoid having an axial symmetry. Since in the ideal case the liquid crystal material in the driven state is uniaxial substantially throughout its thickness (in substantially all molecule layers, except for some molecule layers near the substrates, the molecules are perpendicular to the substrates) the situation 11 of FIG. 2 can be represented by means of the indicatrix 14 in FIG. 3 with an ellipsoid shape and the principal axis transverse to the liquid crystal layer, the refractive index $n_z$ perpendicular to the substrates being larger than that in the planes parallel to the substrates ($n_x = n_y$).

Since the liquid is not isotropic, there is birefringence. It can be shown that this birefringence can be compensated by a retardation foil or compensation layer 9 with an indicatrix 15 in FIG. 3 having an ellipsoid shape and an axis transverse to the liquid crystal layer, the refractive index $n_z$ perpendicular to the substrates being smaller than that in the planes parallel to the substrates ($n_x = n_y$). Such a layer or foil may be realised as a polymerized poly-p-xylylene (PPX) which is shown diagrammatically in FIG. 5a. This can be obtained by bringing a cyclic dimer of this material in vacuo into the gaseous phase at a temperature of between 100° and 200° C. and by passing it as a gas through a pyrolysis furnace (600° to 700° C.). The dimer then decomposes to a monomer which condenses and polymerizes at room temperature. For the relevant polymer, it is alternatively possible to choose chlorinated poly-p-xylylene (PPX-C) (see FIG. 5b), which has less discoloration. The relevant layers may be provided on an optically isotropic material such as glass or cellulose triacetate foil, but they may also be implemented as separate films. Such films appear to be anisotropic, the refractive index $n_z$ perpendicular to the film (the substrate) being smaller than those in the planes parallel to the film (substrate) ($n_x = n_y$). Table I shows the difference in optical path length for two such films ($\Delta n = n_z - n_x = n_z - n_y$).

TABLE 1

| layer thickness (μm) | d.Δn (nm) |
|---|---|
| 2.4 | −40 |
| 10.3 | −120 |

A satisfactory compensation of the remaining birefringence can be obtained with these layers, while the layers can be manufactured in a simple manner.

Figure 2:
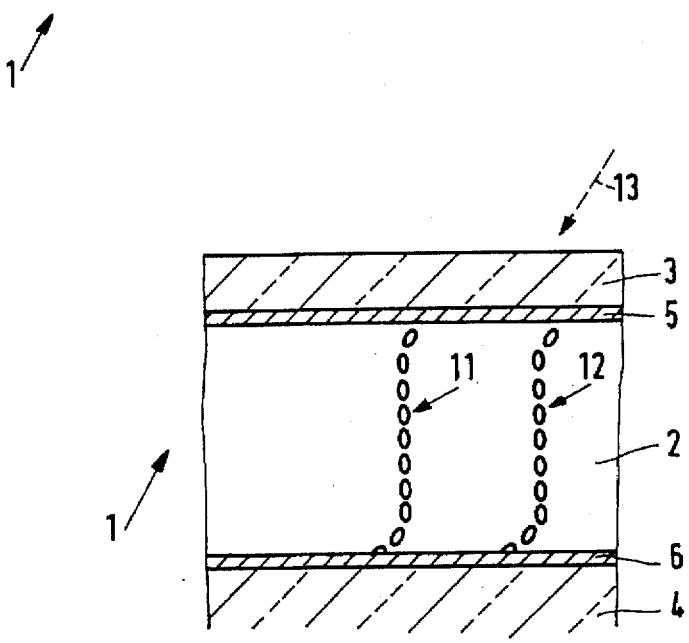
FIG. 2 shows a part of the device of FIG. 1.
Figure 3:
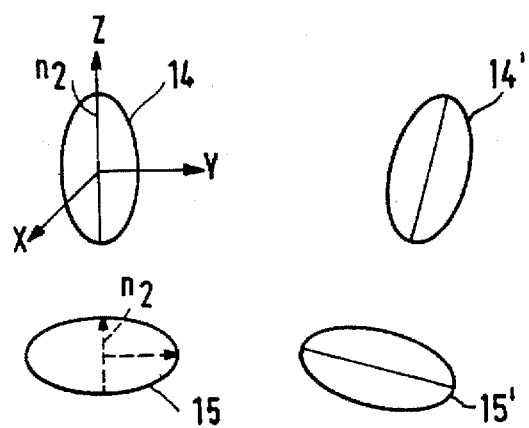
FIG. 3 shows diagrammatically the optical behaviour of the device of FIG. 2, with indicatrices, FIG. 4(a–c) shows diagrammatically a number of variants of the device of FIG. 1, while FIG. 5(a, b) shows structure formulas of a material used in an optically anisotropic layer, and FIG. 6(a, b) shows diagrammatically how the angle dependence is reduced by means of the optically anisotropic layer at different voltages in the transmission/voltage characteristic.

For the more practical situation 12 in FIG. 2, the indicatrix 14' (FIG. 3) has a principal axis which extends at a small angle to the axis transverse to the liquid crystal layer; it is, as it were, slightly tilted. A compensation layer 9 between the liquid crystal material 2 and the polarizer 8, with indicatrix 15, which is optimal for the situation 11, will have a relatively small effect in this case.

The invention provides optically anisotropic compensation layers 9 preferably but not necessarily having such an indicatrix 15' that the birefringence is substantially entirely compensated for the more practical adjustment of, for example situation 12; as it were, the indicatrix 15' is tilted in the same way with respect to the principal axis as the indicatrix 14'. The optical axis of the optically anisotropic layer thus extends at an angle to the direction perpendicular to the substrates by slightly tilting this foil 9 (FIG. 4a). To minimize reflections, the interspace may be filled up with a material 10 having the same refractive index as the substrate material, and the compensation material is, for example an epoxy resin based on bisphenol-A which is thermally cured by means of an amine or an anhydride, or an ethoxylated bisphenol-A diacrylate which, in the presence of a photoinitiator, is cured by means of UV light.

At larger dimensions, such a construction will become very thick. For the procedure of manufacturing the retardation filters on substrates, there are, however, a number of variations which yield favourable results. For example, the manufacturing procedure may be based on sawtooth-shaped substrates, which results in a foil 9 as is shown in FIG. 4b. The resultant optically anisotropic layer now has a sawtooth structure at both sides, the long sides of the sawtooth extending at a small angle to the substrates 3, 4. The optical axis of the foil 9 now no longer coincides with the optical axis of the liquid crystal cell formed by the liquid crystal material 2 and the substrates 3. To avoid optical disturbance by the sawtooth pattern, the pitch of the sawtooth is chosen to be smaller than the dimension of a pixel of the display device. The sawtooth patterns at both sides of the foil may be rotated with respect to each other, for example through 90 degrees. The structure of FIG. 4B then has a smaller retardation.

The sawtooth structure may alternatively be provided on one boundary surface only (FIG. 4c). Instead of a sawtooth structure, a periodical structure which is different therefrom may alternatively be chosen, for example a structure having a varying radius of curvature as is shown by means of the broken lines 17 and 13 in FIGS. 4b and 4c, respectively.

The extent of asymmetry may be increased by adding a uniaxial foil having a small Δn to the foil 9; this may be, for example the substrate on which the monomer layer is provided (for example, polycarbonate). Alternatively, the layer may be slightly stretched after the polymerization has been partly finished, while the birefringence of the stretched substrate on which the monomer layer is provided may also be a contribution.

The extent of "obliqueness of the optical axis" is also determined by the voltage range in which birefringence must be compensated so as to obtain complete extinction. For example, a range 22 in the transmission/voltage curve may be chosen around a given voltage $V_{comp}$ (FIG. 6a) in which the position of the directors in the liquid crystal material hardly deviates from that shown in the situation 11 of FIG. 2. In this case, a slightly broken symmetry is sufficient. When a range 22' in the transmission/voltage curve is chosen around a given voltage $V'_{comp}$ (FIG. 6a) in which the position of the directors in the liquid crystal material deviates considerably from that in the situation 11 of FIG. 2, a much more oblique position of the optical axis of the anisotropic layer 9 must be used. Optimum extinction can be obtained by rotating the compensation layer with respect to the liquid crystal layer, if necessary.

Although the invention has been described with reference to a liquid crystal cell of the twisted-nematic type, it may alternatively be used for cells based on dispersion, for example a liquid crystal with a dichroic dye. In that case, one polarizer is sufficient.

In summary, the invention provides a liquid crystal display cell having a compensation layer of (polymer) material deposited from the gaseous phase such as, for example (chlorinated) polymerized poly-p-xylylene (PPX). To obtain a smaller angle dependence, the birefringence of the compensation layer may be rendered complementary to that associated with a given voltage across the liquid crystal cell by giving the optical axis of the compensation layer an angle with respect to the direction transverse to the cell.

What is claimed is:

1. A liquid crystal display device comprising a liquid crystal display cell having a layer of nematic liquid crystal material which is present between two substrates provided with electrodes, and having a polarizer and an optically anisotropic layer, the optically anisotropic layer comprising poly-p-xylylene or a derivative thereof.

2. A liquid crystal display device as claimed in claim 1, wherein the optical axis of the optically anisotropic layer extends at an angle to a direction transverse to the substrates.

3. A liquid crystal display device as claimed in claim 1, wherein the optical axis of the optically anisotropic layer is substantially parallel to the direction of the directors of the liquid crystal molecules, taken as an average across the layer of nematic liquid crystal material at a given voltage.

4. A liquid crystal display device as claimed in claim 1, wherein the optically anisotropic layer is provided at an angle to one of the substrates.

5. A liquid crystal display device as claimed in claim 1, wherein the optically anisotropic layer has a surface structure on at least one of its boundary surfaces.

6. A liquid crystal display device as claimed in claim 5, wherein the optically anisotropic layer has a sawtooth structure on at least one of its boundary surfaces.

7. A liquid crystal display device as claimed in claim 1, wherein the optically anisotropic layer comprises a layer having a uniaxial symmetry.

8. A liquid crystal display device comprising a liquid crystal display cell having a layer of nematic liquid crystal material which is present between two substrates provided with electrodes, and having a polarizer and an optically anisotropic layer, the optical axis of the optically anisotropic layer extending at an angle to a direction transverse to the substrates, wherein the optically anisotropic layer comprises chlorinated poly-p-xylylene.

9. A liquid crystal display device comprising a liquid crystal display cell having a layer of nematic liquid crystal material which is present between two substrates provided with electrodes, and having a polarizer and an optically anisotropic layer, the optically anisotropic layer being provided by means of gaseous phase deposition, wherein the optically anisotropic layer has a surface structure on at least one of its boundary surfaces and a sawtooth structure on at least one of its boundary surfaces.

10. A liquid crystal display device as claimed in claim 9, wherein both boundary surfaces of the optically anisotropic layer have a sawtooth structure whose direction is rotated with respect to each other.

11. A liquid crystal display device comprising a liquid crystal display cell having a layer of nematic liquid crystal material which is present between two substrates provided with electrodes, and having a polarizer and an optically anisotropic layer, the optically anisotropic layer being provided by means of gaseous phase deposition, wherein the optically anisotropic layer comprises chlorinated poly-p-xylylene.

12. A liquid crystal display device comprising a liquid crystal display cell having a layer of nematic liquid crystal material which is present between two substrates provided with electrodes, and having a polarizer and an optically anisotropic layer, the optical axis of the optically anisotropic layer extending at an angle to a direction transverse to the substrates, wherein the optically anisotropic layer has a surface structure on at least one of its boundary surfaces and has a sawtooth structure on at least one of its boundary surfaces.

13. A liquid crystal display device comprising a liquid crystal display cell having a layer of nematic liquid crystal material which is present between two substrates provided with electrodes, and having a polarizer and an optically anisotropic layer, the optical axis of the optically anisotropic layer extending at an angle to a direction transverse to the substrates, wherein the optical axis of the optically anistropic layer is substantially parallel to the direction of the directors of the liquid crystal molecules, taken as an average across the layer of nematic liquid crystal material at a given voltage and wherein the optically anisotropic layer has a surface structure on at least one of its boundary surfaces and has a sawtooth structure on at least one of its boundary surfaces.

* * * * *